(12) United States Patent
Corghi

(10) Patent No.: US 6,527,032 B2
(45) Date of Patent: Mar. 4, 2003

(54) AUTOMATIC BEAD RELEASE DEVICE FOR TIRE REMOVAL MACHINES, AND TIRE REMOVAL MACHINES EQUIPPED THEREWITH

(75) Inventor: Remo Corghi, Correggio (IT)

(73) Assignee: Corghi S.p.A., Reggio Emilia (IT)

( * ) Notice: Subject to any disclaimer, the term of this patent is extended or adjusted under 35 U.S.C. 154(b) by 0 days.

(21) Appl. No.: 09/843,697

(22) Filed: Apr. 30, 2001

(65) Prior Publication Data

US 2001/0042601 A1 Nov. 22, 2001

(30) Foreign Application Priority Data

May 22, 2000 (IT) ......................................... RE00A0052

(51) Int. Cl.[7] ............................................. B60C 25/128
(52) U.S. Cl. ........................ 157/1.28; 157/1.24; 157/14
(58) Field of Search ............................... 157/1.24, 1.28, 157/14, 16, 19

(56) References Cited

U.S. PATENT DOCUMENTS

| 5,219,012 A | * | 6/1993 | Corghi ......................... 157/16 |
| 5,226,465 A | * | 7/1993 | Schon et al. ................ 157/1.28 |
| 6,176,288 B1 | * | 1/2001 | Kane et al. ................. 157/1.24 |

* cited by examiner

Primary Examiner—James G. Smith
(74) Attorney, Agent, or Firm—Browdy and Neimark

(57) ABSTRACT

An automatic bead release device for tire removal machines, comprising, for supporting the wheel rim complete with tire, rotary means associated with a frame which supports a bead release disc in contact with the tire just external to the flange of the wheel rim, a shaft parallel to its axis of rotation, on which said frame slides to approach and withdraw from the wheel rim, means for moving said frame along said shaft, and means for lightly inserting said disc below the flange of the wheel rim after it has come into contact with it.

13 Claims, 5 Drawing Sheets

AUTOMATIC BEAD RELEASE DEVICE FOR TIRE REMOVAL MACHINES, AND TIRE REMOVAL MACHINES EQUIPPED THEREWITH

This invention concerns bead release devices used for detaching the tyre bead from the bead retaining flange of the wheel rim.

The known art teaches that to remove a tyre from the wheel rim the first operation to be carried out is to detach the tyre bead from the bead retaining flange of the wheel rim. Said operation is effected by devices, known as bead release tools, usually installed on tyre removal machines.

Said devices are generally positioned to the side of the machine casing, and comprise a horizontal arm, one end of which is hinged to said base on a vertical axis, its opposite end carrying a bead release tool in the form of a curved blade.

Said arm is associated with a pad mounted on said casing, against which the wheel. comprising the wheel rim and tyre, rests during the bead release operation.

Between the arm and the casing there is interposed a pneumatic cylinder-piston unit, provided to move said arm towards the machine casing in order to accomplish the bead release.

Although devices of this type satisfy their purpose, they present certain drawbacks.

Firstly, they operate on the wheel while at rest, and involve only a sector of the tyre edge at a time.

In addition, as the operator has to maintain the wheel at rest during tyre release, he finds himself relatively close to the region in which the tool operates, and is consequently subject to the risk of accidents.

A further drawback is the physical force which the operator has to apply to maintain the wheel at rest during bead release, and to rotate it to repeat the operation along different sectors of the tyre edge.

Finally, with bead release devices of known type the operator is compelled to turn the wheel over at least once through 180° about a diametrical axis to be able to carry out the operation along both edges of the tyre, hence increasing the time required for the operation.

The object of the present invention is to overcome the drawbacks of the known art within the framework of a rational and reliable solution which enables the operator to dispense with the need to intervene actively during the operation.

The invention attains said object by virtue of a bead release device which, associated with rotary support means for the complete wheel rim of the tyre, acts on at least one side thereof while rotating, without any intervention by the operator.

According to the invention the device is associated with means for positioning the flange of the wheel rim in a fixed position relative to the tool of the bead release device, by virtue of the fact that the wheel rim support device can translate parallel to itself towards and away from the bead release device, or vice versa.

Preferably the bead release device is fixed in position, whereas the wheel rim support means move towards and away from it.

Moreover, the wheel rim support means are preferably such as to leave both flanges of the wheel rim free, so that the bead release device can act simultaneously on both.

Finally, the combination of the bead release device with said rotary support means for the wheel rim results in an assembly which can be easily provided with tools, of known type, for mounting and/or removing the tyre bead onto or from the flange of the wheel rim, so resulting in a complete tyre removal machine.

The particular characteristics of the invention are defined in the claims.

The constructional and operational characteristics will be more apparent from the ensuing description of a preferred embodiment thereof given by way of non-limiting example and illustrated in the accompanying drawings.

The ensuing description, with reference as stated to said figures, concerns for economy of description a complete tyre removal machine, but without this limiting the protection of the patent to the combination of all the means described.

Figure 2:
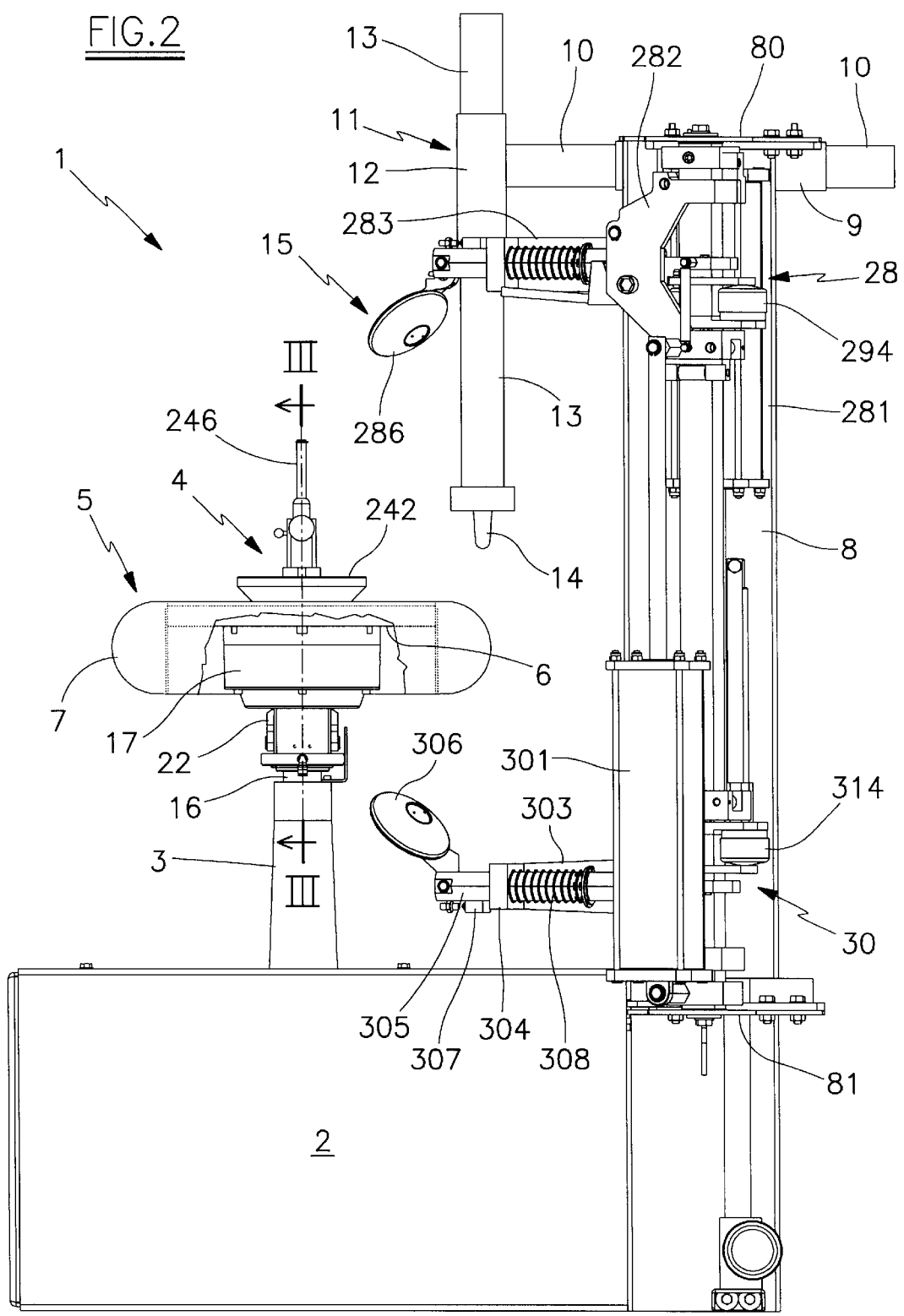
FIG. 2 is a side view of FIG. 1.

Said figures show the tyre removal machine 1, which comprises a lower base 2, from the upper surface of which there projects a shell 3 containing a vertical shaft 16 carrying the means 4 for supporting and locking in position the wheel 5, inclusive of the wheel rim 6 and tyre 7, as shown in FIG. 2.

To the base 2 there is fixed a vertical column 8 carrying both the support and positioning means for the usual tyre mounting and removal tool 14, known per se, and the bead release device 15 with which the invention is provided.

The shaft 16 is a rotary shaft supported by a lower moving assembly, not shown, which can translate horizontally within the vertical plane comprising the axis of the tool 14.

An example of such a moving assembly is disclosed in U.S. Pat. No. 5,458,177, which discloses a machine for mounting tyres on and removing tyres from wheel rims of any diameter, and which includes means 7 which that slide horizontally with respect to a base 3.

Figure 3:
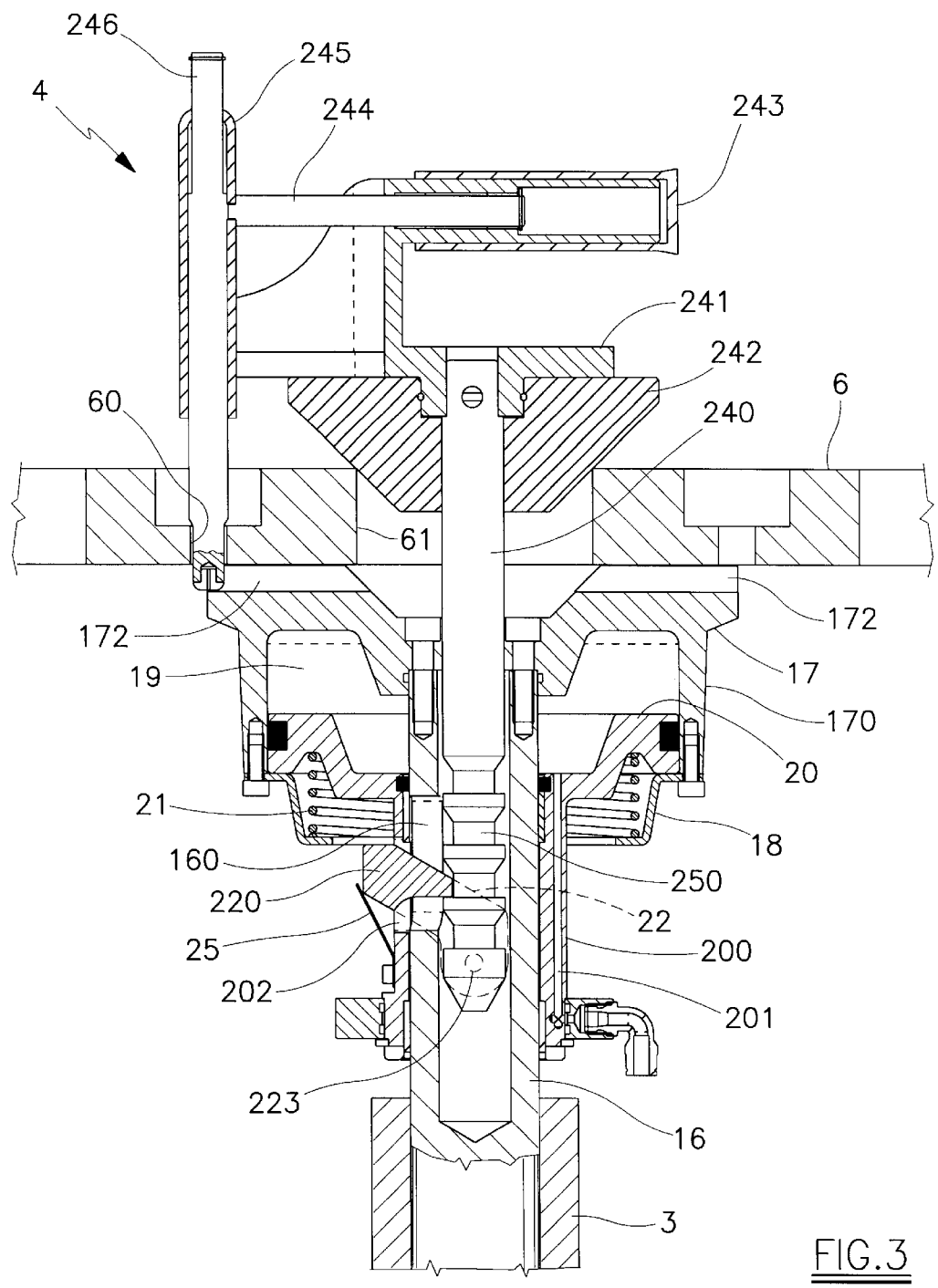
FIG. 3 is a section on the line III—III of FIG. 2.

With reference to FIG. 3, the means 4 for locking the wheel rim 6 comprise a hollow upper-end portion of the shaft 16 with its internal cavity of hexagonal cross-section, to the upper end of which there is fixed a circular plate 17 onl which the wheel rim 6 is rested.

The plate 17 is provided with upper radial grooves 172 and with a lower cylindrical skirt 170, to the free end of which there is fixed a cover 18 which, together with said skirt, defines a chamber 19.

Within the skirt 170 there slides an annular piston 20 provided with a hollow rod 200 scaledly mounted about the shaft 16.

Within the wall of the hollow rod 200 there is present a conduit 201 which feeds compressed air onto the piston 20.

Between said piston 20 and said cover 18 there is interposed a compressed spring 21.

The rod 200 of the piston 20 supports an external U-shaped pawl 22 which embraces the rod and comprises a central tooth 220. The pawl rocks about two projecting pins 23 positioned on the same diametrical axis, and is provided with a tooth 220 which enters into the interior of said hollow shaft 16 via apertures 202 and 160.

The interior of said hollow shaft 16 receives the bar 240, also of hexagonal cross-section, of a device 24 provided for locking the wheel rim 6 in the working position.

Said device 24 comprises said bar 240, which is fixed to an upper member 241 to which there is also fixed a locking cone 242, which is mounted about the bar 240.

The member 241 also comprises an internally hollow handle 243 within which there slides a bar 244, the free end of which carries a vertical sleeve 245 within which a second bar 246 slides. When the wheel rim 6 is in the working position, the bar 240 is inserted into the hollow shaft 16, and said second bar 246 is positioned in one of the holes 60 intended to receive the bolts by which the wheel rim is fixed to the vehicle.

The hexagonal cross-section of the bar 240 ensures that when the device 24 is inserted, the lower end of the bar 246 always encounters and becomes inserted in one of the radial grooves 172 present in the circular plate 17.

The bar 240 comprises annular projections 250 which are upperly flat and lowerly conical, so that when the bar is inserted into the hollow shaft 16 the conical part of the projections causes the pawl 22 to rotate against the action of a leaf spring 25, while at the same time the bar is unable to be withdrawn because the leaf spring maintains the pawl 22 above the upper flat surface of said projections 250.

The bar 240 is inserted into the hollow shaft 16 until the cone 242 encounters the outer surface of the central hub 61 of the wheel rim 6. At this point by feeding compressed air through the conduit 201 the piston 20 descends against the action of the spring 21. The descent of the piston also determines the lowering of the pawl 22, the tooth 220 of which rests against the flat upper surface of the annular projections 250, and remains locked in position by the action exerted by the leaf spring 25. In this manner, the wheel rim 6 becomes locked in the working position.

The wheel rim is released by simply releasing the compressed air from the operating chamber 19. In this manner, the spring 21 causes the piston 20 and the pawl 22 to rise, this latter, by its rotation, disengaging from the annular projection 250.

Figure 4:
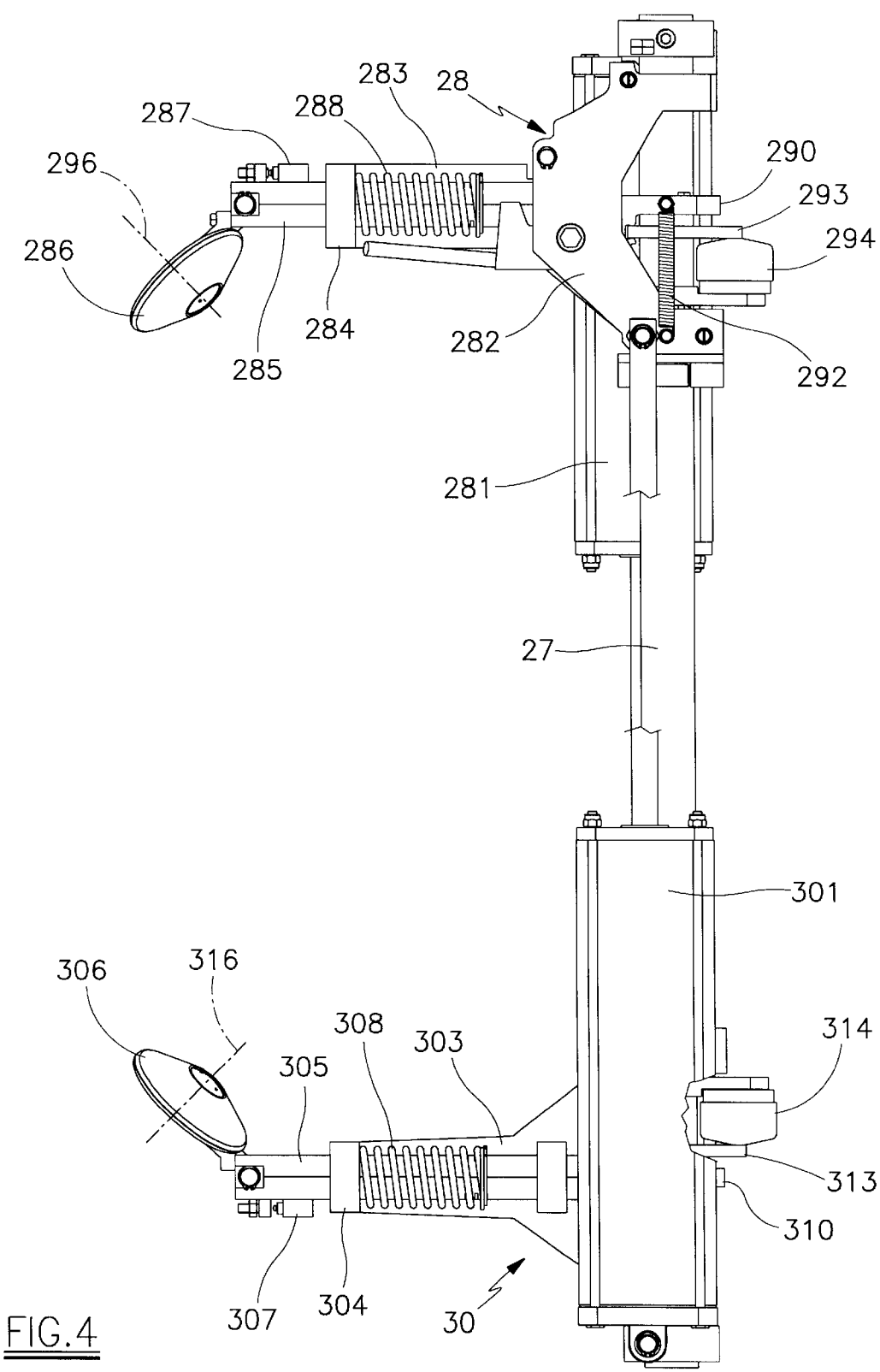
FIG. 4 is a partially interrupted view of the bead release device used by the invention.
Figure 5:
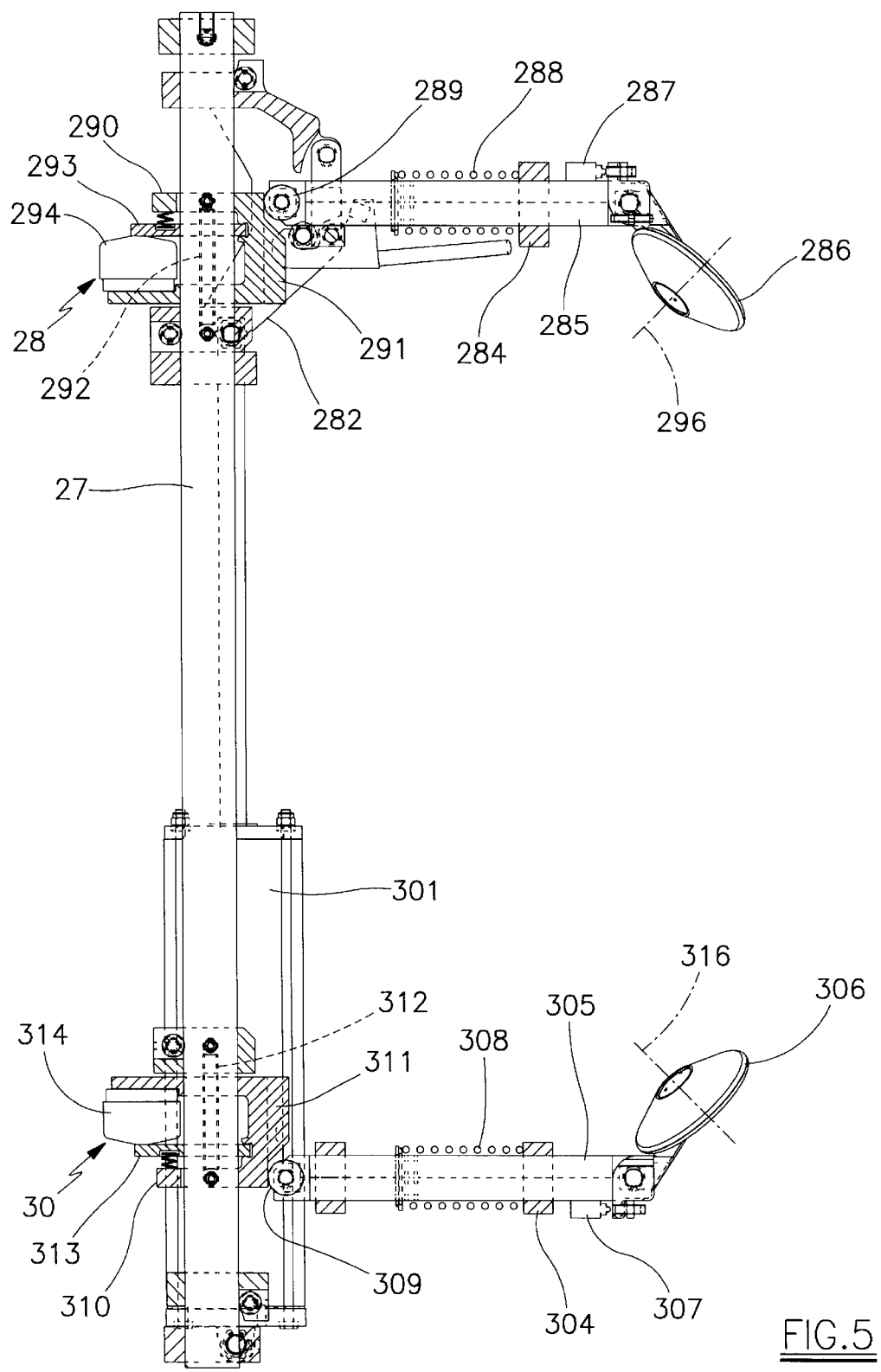
FIG. 5 is a vertical section through FIG. 4.

As shown in FIGS. 4 and 5, the bead release device comprises a vertical shaft 27, of square or otherwise non-circular cross-section, supported between the plates 80 and 81, which are rigid with the column 8 and with the machine base respectively.

The shaft 27 can rotate about its axis, being driven by an actuator, not shown but of known type.

On said shaft 27 there slide two units 28 and 30, driven by cylinder-piston units 281 and 301 respectively.

The upper unit 28 comprises a frame 282 having a lateral plate 283 from which there branch two blocks 284 provided with axial holes within which there slides a bar 285 of non-circular cross-section.

At one end, the bar 285 rotatably carries the bead release disc 286, which is idle about its axis 296 and is maintained in position by a spring, its rotation being measured by the feeler 287.

The bar is maintained urged inwards (towards the left in FIG. 5) by the spring 288 and carries at its opposite end a roller 289 which rests against a profiled block 290, above a projecting cam 291.

The profiled block 290 is slidable on the shaft 27 and maintained resting against the frame 28 by the spring 292, and can be locked on the shaft 27 by the strangling plate 293 rotated by the air piston 294.

The air piston 294 is controlled by the feeler 287, which measures the rotation of the head release disc 286 when this rests against the tyre bead.

The unit 30 is identical to the unit 28, and is disposed inverted thereto at the lower end of the shaft 27.

The components of the unit 30 are identified by the numbers from 301 to 316, corresponding to the numbers from 281 to 296 of the corresponding components of the unit 28.

The units 28 and 30 are maintained at their respective ends of the shaft 27 by the cylinder-piston units 281 and 301 respectively.

Figure 1:
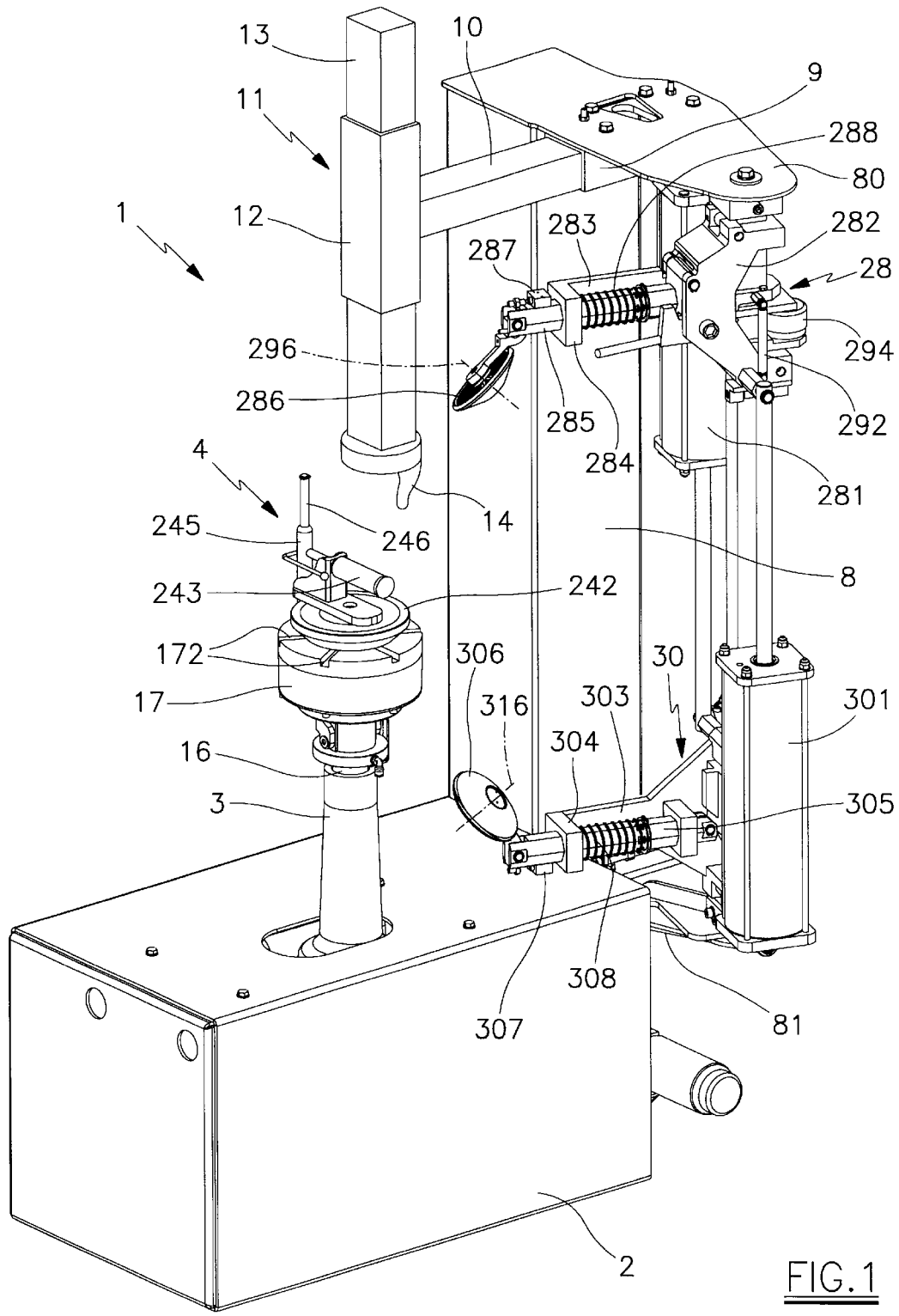
FIG. 1 is a perspective view of the invention.

With reference to FIGS. 1 and 2, the support and positioning, means 11 for the usual tool 14 comprise a horizontal guide sleeve 9, which is fixed to the plate 80 rigid with the column 8, and to the interior of which the profiled bar 10 is fixed. It should be noted that the horizontal axis of the bar 10 intersects the central vertical axis of said means 4 for supporting the wheel 5 and locking it in position.

At the end of said profiled bar 10 there is supported a guide of vertical axis, which receives and can lock a rod 13, to the lower end of which there is connected the usual tool 14 which interacts with the bead of the tyre 7.

A programmed electronic processor unit coordinates the movement of certain of the aforedescribed devices as will be apparent hereinafter.

The aforedescribed devices operate in the following manner.

The operator places the wheel rim 6 complete with tyre 7 on the plate 17 in an approximately centered position.

He then inserts the bar 240 of the locking means 4 into the cavity of the shaft 16 until the conical member 242 centres the central hole of the wheel rim; at the same time he inserts the locking bar 246 though one of the wheel rim holes intended to receive the fixing bolts, taking care that the end of the locking bar enters one of the grooves 172 in the plate 17.

In this manner the locking bar is arranged to rotate the wheel rim, which remains secured both upperly and lowerly.

After these operations, the operator feeds compressed air into the chamber 19, causing the piston 20 to descend and properly lock the assembly.

At this point the operator feeds the wheel rim dimensions to the processor, which then causes the shaft 16 to translate until it reaches a zero position in which the bead release discs 286 and 306 lie just outside the flange on the wheel rim.

Simultaneously, the processor causes the shaft 27 to rotate such that the axes 296 and 316 of rotation of the bead release discs 286 and 306 cut the axis of the shaft 16.

The machine is thus ready to release the bead and possibly remove the tyre in a completely automatic manner.

The operator has only to feed compressed air to the two cylinder-piston units 281 and 301, which cause the units 28 and 30 to approach the wheel from both sides of it.

The operation of only the unit 28 will now be described as the operation of the unit 30 is identical.

When the disc 286 comes into contact with the sidewall of the tyre in the immediate vicinity of the wheel rim flange, it rotates slightly upwards to operate the feeler 287.

This latter causes the cylinder-piston unit 294 to incline the strangling plate 293, which hence locks the block 290 to the shaft 27.

As the frame 28 continues to descend downwards, the rear roller 289 of the profiled bar 285 rises along the cam 291 to compel the bar to slide slightly forwards to insert the disc 286 slightly below the wheel rim flange, and act exactly on the wheel tyre.

The piston 281 acts as an air spring, so maintaining the disc 286 pressed downwards with the necessary force, the rotation of the wheel causing it to act along the entire length of the head, to remove this latter perfectly from the wheel rim flange.

When the bead has been detached, the tyre is removed in the normal manner by the tool 14, which is lowered manually into position and locked with usual means by the operator.

What is claimed is:

1. A tire removal machine comprising:

a base;

horizontally movable rotary means project upwardly from said base for supporting a wheel rim carrying a tire, the wheel rim having a flange and the tire having a bead, said rotary means being rotatable about a vertical axis;

a vertically oriented shaft of non-circular cross section supported by said base;

at least one frame slidable on said shaft;

means for moving said at least one frame along said shaft;

a profiled block, comprising a projecting cam, said profiled block being slidable on said shaft;

a spring disposed for urging said profiled block against said at least one frame;

means for locking said profiled block on said shaft;

a bead release disc for contacting the bead of the tire;

a bar of non circular cross section slidable in said frame and having a first end supporting said bead release disc; and a cam follower supported at a second end of said bar to rest against said cam.

2. The tire removal machine according to claim 1 in which said means for locking said profiled block on said shaft comprise a strangling plate rotated by an air piston.

3. The tire removal machine according to claim 2 in which said bead release disc is elastically hinged to said bar, to control said air piston by a feeler which measures the rotation of said bead release disc when said bead release disc rests against the tire bead.

4. The tire removal machine as claimed in claim 1, in which said shaft is associated with means which cause said shaft to rotate on command, to position said bead release disc such that the axis of said bead release disc intersects the axis of rotation of the wheel rim.

5. The tire removal machine as claimed in claim 1, in which said means for moving said at least one frame along the shaft comprise a pneumatic cylinder-piston unit.

6. The tire removal machine as claimed in claim 1, wherein said at least one frame comprises two frames symmetrically disposed on said shaft in symmetrically facing positions.

7. The tire removal machine as claimed in claim 1, in which said rotary means are slidable in a horizontal direction in order to be positioned at a desired distance from said shaft.

8. The tire removal machine as claimed in claim 7, in which said rotary means comprise a rotary hollow shaft provided with an upper plate, a pawl means insertable laterally into the interior of said hollow shaft, a bar having an upper end and provided with circumferential teeth and insertable into said hollow shaft, within which said teeth engage said pawl, a centering and locking cone for the wheel rim, said cone being carried at said upper end of said bar; and means for causing said pawl means to move axially to said shaft to lock said cone against the wheel rim.

9. The tire removal machine as claimed in claim 8, in which the upper plate is provided with radial grooves, in one of which there engages the lower end of a locking bar slidable within a seat rigid with the centering cone.

10. The tire removal machine as claimed in claim 8, in which said upper plate of said rotary hollow shaft comprises a descending cylindrical skirt within which there sealedly slides a piston provided with a hollow rod positioned externally to the shaft, said hollow rod being provided with an aperture through which said pawl means acts, and said hollow shaft having a wall provided with an opening at a location corresponding with the aperture and through which said pawl comes into contact with the teeth of the bar.

11. The tire removal machine as claimed in claim 10, in which the conduit which feeds compressed air onto the piston is provided within the wall of the hollow rod of the piston.

12. The tire removal machine according to claim 1 further comprising a column carrying at least one tool arranged to interact with the tire bead, said at least one tool undergoing movements parallel to the axis of rotation of the wheel rim, and wherein said rotary means for supporting the wheel rim are movable in translation to position the flange of the wheel rim in a fixed zero position relative to a direction of movement of said at least one tool.

13. The tire removal machine as claimed in claim 12, in which said at least one tool is a tire removal tool.

* * * * *